US009587583B2

(12) United States Patent
Caruel et al.

(10) Patent No.: US 9,587,583 B2
(45) Date of Patent: Mar. 7, 2017

(54) TURBOJET ENGINE NACELLE HAVING A VARIABLE NOZZLE

(71) Applicant: AIRCELLE, Gonfreville L'Orcher (FR)

(72) Inventors: Pierre Caruel, Le Havre (FR); Patrick Gonidec, Bretx (FR); Patrick Boileau, Tournefeuille (FR)

(73) Assignee: AIRCELLE, Gontreville L'Orcher (FR)

( * ) Notice: Subject to any disclaimer, the term of this patent is extended or adjusted under 35 U.S.C. 154(b) by 559 days.

(21) Appl. No.: 14/173,484

(22) Filed: Feb. 5, 2014

(65) Prior Publication Data

US 2015/0354499 A1 Dec. 10, 2015

Related U.S. Application Data

(63) Continuation of application No. PCT/FR2012/051501, filed on Jun. 29, 2012.

(30) Foreign Application Priority Data

Aug. 5, 2011 (FR) ...................................... 11 57174

(51) Int. Cl.
*F02K 1/76* (2006.01)
*F02K 1/62* (2006.01)
(Continued)

(52) U.S. Cl.
CPC ................ *F02K 1/763* (2013.01); *F02K 1/06* (2013.01); *F02K 1/12* (2013.01); *F02K 1/30* (2013.01);
(Continued)

(58) Field of Classification Search
CPC .......... F02K 1/763; F02K 1/625; F02K 1/766; F02K 1/12; F02K 1/06; F02K 1/30; F02K 1/72
See application file for complete search history.

(56) References Cited

U.S. PATENT DOCUMENTS

| 3,779,010 A | 12/1973 | Chamay et al. |
| 2003/0126856 A1 | 7/2003 | Lair |
| 2005/0126174 A1 | 6/2005 | Lair |

FOREIGN PATENT DOCUMENTS

| FR | 2 934 326 A | 1/2010 |
| WO | 2009/029401 A2 | 3/2009 |

OTHER PUBLICATIONS

International Search Report issued Oct. 19, 2012 in International Application PCT/FR/2012/051501.

*Primary Examiner* — Moshe Wilensky
(74) *Attorney, Agent, or Firm* — Burris Law, PLLC

(57) ABSTRACT

A turbojet engine nacelle has a thrust reverser device and an actuating system for said thrust reverser device, and the thrust reverser device includes a moving cowl mounted translatably alternating between a closed position and an open position, and a jet nozzle section for gases that extends the moving cowl. In particular, the jet nozzle section includes a nozzle flap mounted movable between a closed position and an open position in which the nozzle flap opens a leakage passage toward the outside of the nozzle section. The actuating system has an actuator shared with the moving cowl and the nozzle flap to activate the translational movement of the moving cowl and to pivot the nozzle flap between three following positions: an idle position, an open position of the nozzle flap and an open position of the moving cowl.

9 Claims, 3 Drawing Sheets

(51) Int. Cl.
*F02K 1/06* (2006.01)
*F02K 1/12* (2006.01)
*F02K 1/30* (2006.01)
*F02K 1/72* (2006.01)

(52) U.S. Cl.
CPC ............... *F02K 1/625* (2013.01); *F02K 1/72* (2013.01); *F02K 1/766* (2013.01); *Y02T 50/671* (2013.01)

TURBOJET ENGINE NACELLE HAVING A VARIABLE NOZZLE

CROSS-REFERENCE TO RELATED APPLICATIONS

This application is a continuation of International Application No. PCT/FR2012/051501, filed on Jun. 29, 2012, which claims the benefit of FR 11/57174, filed on Aug. 5, 2011. The disclosures of the above applications are incorporated herein by reference.

FIELD

The present disclosure relates to a turbojet engine nacelle equipped with a thrust reverser device extended by a variable nozzle.

BACKGROUND

The statements in this section merely provide background information related to the present disclosure and may not constitute prior art.

A nacelle generally has a tubular structure comprising an air intake upstream from the turbojet engine, a middle section designed to surround a fan of the turbojet engine, a downstream section housing a thrust reverser device and designed to surround the combustion chamber of the turbojet engine, and generally ends with a jet nozzle whereof the outlet is situated downstream from the turbojet engine.

Modern nacelles are designed to house a dual flow turbojet engine capable of using the rotating fan blades to generate a hot air flow (also called primary flow) coming from the combustion chamber of the turbojet engine, and a cold air flow (secondary flow) that circulates outside the turbojet engine through an annular passage, also called tunnel, formed between the fairing of the turbojet engine and an inner wall of the nacelle. The two air flows are discharged from the turbojet engine through the rear of the nacelle.

During landing of the aircraft, the role of a thrust reverser device is to improve the braking capacity of that aircraft by reorienting at least part of the thrust generated by the turbojet engine forward. During this phase, the reverser obstructs the cold flow tunnel and orients the latter toward the front of the nacelle, thereby generating a counterthrust that is added to the braking of the wheels of the airplane.

The means used to perform this reorientation of the cold flow vary depending on the type of reverser. However, in all cases, the structure of a thrust reverser device comprises moving parts movable on the one hand between a deployed position in which they open a passage in the nacelle designed for the deflected flow, and on the other hand a retracted position in which they close that passage.

These moving elements can perform a deflecting function or simply serve to activate other deflecting means.

In the case of a cascade reverser, the thrust reverser device includes cascade vanes serving to reorient the flow of air, associated with reverser flaps and cowls that are translatable in a direction substantially parallel to the longitudinal axis of the nacelle.

The moving cowls serve to slide, so as to expose or cover said cascade vanes. The reverser flaps form blocking doors that can be activated by the sliding of the cowl, closing the tunnel downstream from the vanes, so as to optimize the reorientation of the cold air flow.

Furthermore, aside from its thrust reversal function, the sliding cowl belongs to the rear section and has a downstream side forming the jet nozzle serving to channel the discharge of the flows of air.

This nozzle provides the power necessary for propulsion while imparting a speed to the discharge flows and modulates the thrust by varying its output section in response to variations of the adjustment of the power of the engine and the flight conditions.

It is known, in particular from document WO 2009/029401, to provide, on the nozzle section situated just behind a moving cowl, a nozzle flap mounted movable between a closed position and at least one open position in which said nozzle flap opens a leakage passage toward the outside of the nozzle. In this document, the leakage passages in the nozzle are obtained by translating the nozzle flaps using specific cylinders dedicated to movement of the flaps and separate from the cylinders used to move the moving cowls and therefore allow the deployment of the thrust reverser device.

The interest of using such moving flaps is to be able to adapt the optimal section of the jet nozzle as a function of the different flight phases, i.e., the takeoff, cruising, and landing phases of the airplane.

The main drawback of this type of nacelle is related to the use of actuating cylinders for the moving cowls and additional actuating cylinders for the nozzle flaps, the presence of these additional cylinders causing excess weight for the nacelle and also causing increased complexity to implant such cylinders in a cluttered and narrow environment.

The state of the art may also be illustrated by the teaching of documents U.S. Pat. No. 3,779,010 and US 2003/126856, which each disclose a turbojet engine nacelle including a thrust reverser device with a moving cowl whereof the translation is controlled using an actuator, and with a reverser flap.

SUMMARY

The present disclosure provides a turbojet engine nacelle equipped with a thrust reverser device extended by a variable nozzle that has a structure suitable for checking the variation of the nozzle section, that is simplified and effective for actuating maneuvers of the nozzle and the reverser device.

To that end, the present disclosure provides a turbojet engine nacelle, comprising:
  a thrust reverser device and an actuating system for said thrust reverser device, said device comprising at least one moving cowl mounted translatably in a direction substantially parallel to the longitudinal axis of the nacelle capable of alternating between a closed position, in which it provides the aerodynamic continuity of the nacelle, and an open position, in which it opens a passage in the nacelle designed for a deflected flow; and
  at least one jet nozzle section for gases that extends said moving cowl and includes at least one nozzle flap mounted movable between a closed position and at least one open position in which said nozzle flap opens a leakage passage toward the outside of the nozzle;
  said nacelle being remarkable in that the nozzle flap is mounted pivoting on the moving cowl and the actuating system comprises actuating means shared with the moving cowl and the nozzle flap and capable of activating the translational movement of the moving cowl and the pivoting of the nozzle flap between the three following positions:

a first position, called idle position, in which the moving cowl is in its closing position and the nozzle flap is in its closed position;

a second position, called open position of the nozzle flap, in which the moving cowl is in its closing position and the jet nozzle is in its open position; and a third position, called open position of the moving cowl, in which the moving cowl is in its open position and the nozzle flap is in its closed position.

In this way, the present disclosure proposes rotatably hinging the nozzle flap on the moving cowl, thereby making the monitoring of the adaptation of the nozzle section more reliable relative to a translating flap, and using actuating means shared by the moving cowl and the nozzle flap, which makes it possible both to vary the section (second position with control of the nozzle flap) and the deployment of the reverser device (third position with control of the moving cowl) with the same actuating means.

Thus, the present disclosure makes it possible to save on weight for the nacelle and limit the bulk with joint actuating means for the moving cowl and the nozzle flap that make it possible to have a single control line instead of two control lines in the state of the art.

Furthermore, a pivoting nozzle flap advantageously has a lower risk of jamming than a translating flap.

According to one form, the actuating means are suitable for activating the translation of the moving cowl from its open position toward its closing position, and next activating the pivoting of the nozzle flap from its closed position toward its open position while keeping the moving cowl in its closed position.

In this way, the opening of the nozzle flap only occurs once the moving cowl is closed, to be able to increase the outlet section of the nozzle during direct jet phases.

According to another form, the actuating means are suitable for activating the pivoting of the nozzle flap from its open position to its closed position, and next activating the translational movement of the moving cowl from its closed position toward its open position or keeping the nozzle flap in its closed position.

In this way, the opening of the moving cowl only occurs once the nozzle flap is closed, to be able to reverse thrust without interference from the nozzle flap.

In one particular form, the thrust reverser device includes a front fixed structure, such as a front frame structure, supporting at least one flow deflecting means housed inside the moving cowl in its open position, the actuating means being mounted on said first fixed structure.

Thus, the actuating means are fixedly mounted on the front fixed structure to obtain a stable architecture making it possible to respond to the many mechanical constraints observed in a nacelle.

Advantageously, the nacelle comprises means for locking the moving cowl in its closed position on the front fixed structure, to be able to lock the reverser device in the direct jet position while making it possible to open and close the pivoting nozzle flap(s).

In another form, the nozzle flap is pivotably mounted on an inner wall of the moving cowl.

This form is advantageous for reasons related both to aerodynamics and monitoring the hinge of the pivoting nozzle flap.

According to another form of the present disclosure, the nozzle flap switches from its closed position to its open position by pivoting toward the outside of the nozzle.

In still another form, the actuating means comprise a linear actuator provided with a hollow body inside which a translatable rod is housed, said moving rod crossing through the moving cowl and having a free end fixed on the nozzle flap.

Thus, the actuating means make it possible both to vary the section (control of the nozzle flap) and to deploy the reverser device (control of the moving cowl) with the same translatable rod.

According to other advantageous features of the present disclosure, the rod of the linear actuator is movable between:

the first position, called the idle position, when the rod controls the moving cowl in its closing position and the jet nozzle in its closed position;

the second position, called the open position of the nozzle flap, in which the rod is retracted inside the hollow body relative to the first position, said rod keeping the moving cowl in its closing position and controlling the pivoting of the nozzle flap toward its open position by going from the first to the second position; and the third position, called the open position of the moving cowl, in which the rod is deployed outside the hollow body relative to the first position, said rod controlling the translational movement of the moving cowl toward its open position and keeping the nozzle flap in its closed position by going from the first to the third position.

Thus, from the first idle position, the actuating means make it possible to perform the section variation (control of the nozzle flap by retracting the rod while the cowl remains closed) and also to deploy the reverser device (control of the moving cowl by deploying or removing the rod while the nozzle flap remains closed and is moved in the downstream direction mutually with the cowl).

According to one form, the hollow body is fixed on the front fixed structure.

DRAWINGS

In order that the disclosure may be well understood, there will now be described various forms thereof, given by way of example, reference being made to the accompanying drawings, in which.

Figure 1:
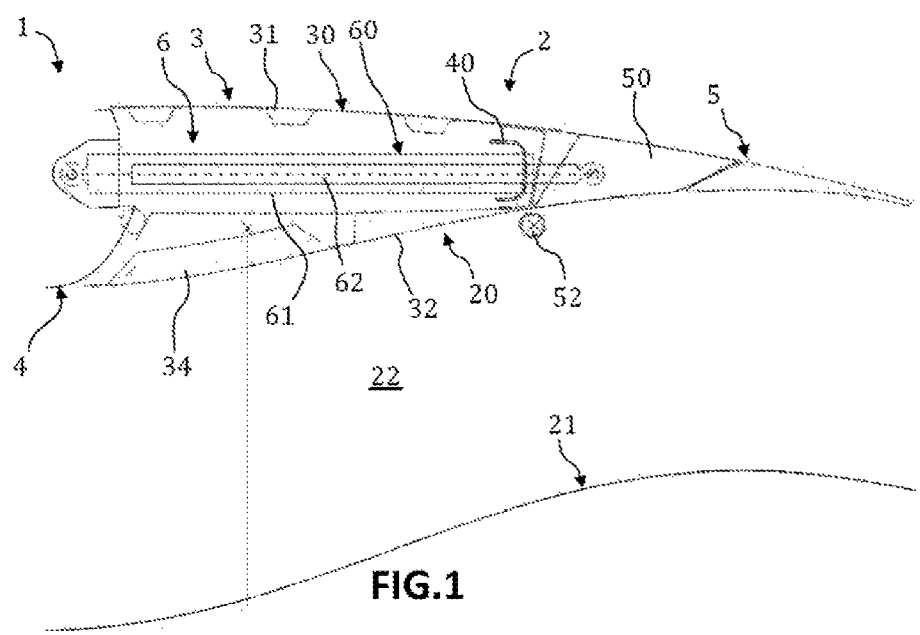
FIG. 1 is a partial diagrammatic cross-sectional longitudinal illustration of the nacelle according to the present disclosure in a first position with the moving cowl and the nozzle flap closed, in which the actuating means of the cowl and the nozzle flap are shown.
Figure 5:
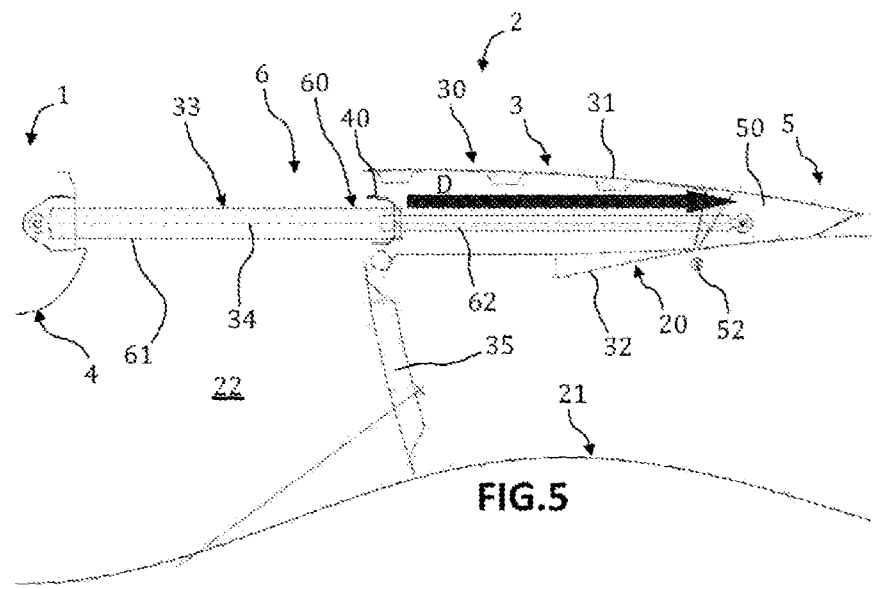
Figure 6:
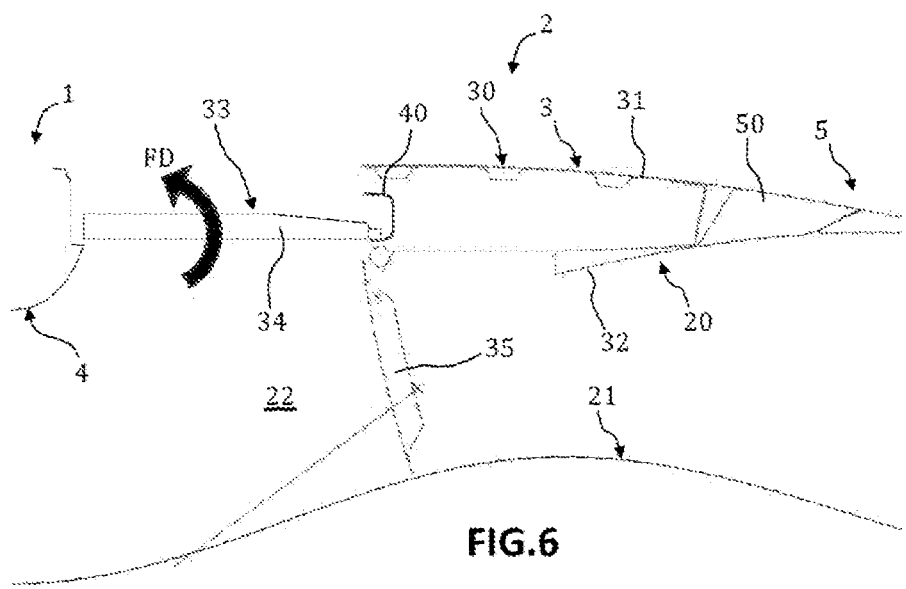

FIG. 5 is a partial diagrammatic longitudinal cross-sectional illustration of the nacelle of FIG. 1 in a third position with the moving cowl open and the jet nozzle closed, in which the actuating means of the cowl and the nozzle flap are shown; and FIG. 6 is a diagrammatic partial longitudinal cross-sectional illustration of the nacelle of FIG. 5 in the third position, in which the cascade vane is shown.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In general, a nacelle is designed to constitute a tubular housing for a dual flow turbojet engine and serves to channel the flows of air that it generates by means of the blades of the fan, i.e., a hot air flow (called primary flow) passing through a combustion chamber and a cold air flow (secondary flow) circulating outside the turbojet engine.

This nacelle comprises an upstream section forming an air intake, a middle section 1 surrounding the fan of the turbojet engine, and a downstream section 2 extending the middle section 1 and surrounding the turbojet engine. FIGS. 1 to 6 show part of the middle section 1 and part of the downstream section 2.

Figure 2:
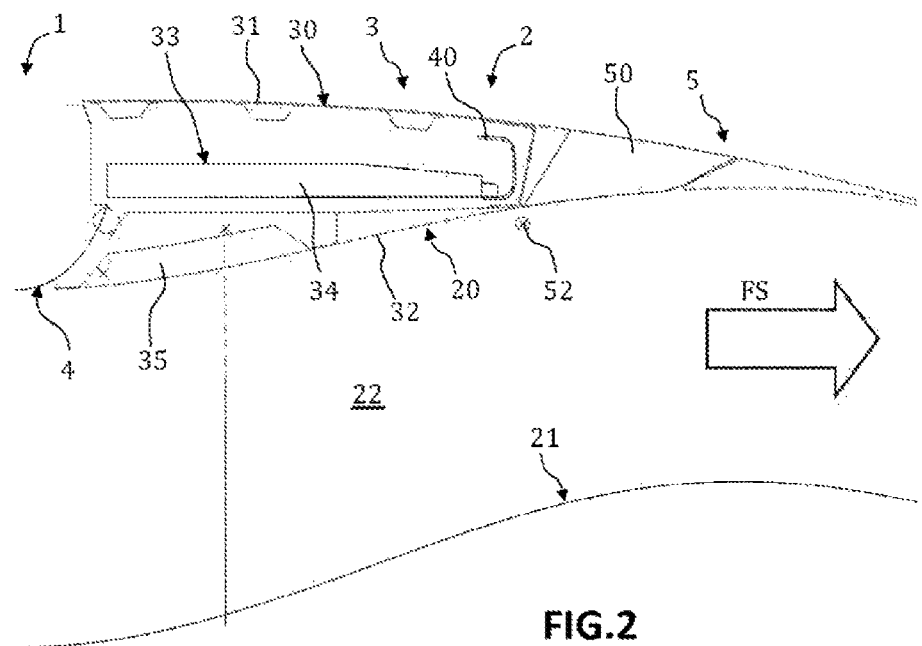
FIG. 2 is a partial diagrammatic longitudinal cross-sectional illustration of the nacelle of FIG. 1 in a first position, in which the cascade vane is illustrated.
Figure 3:
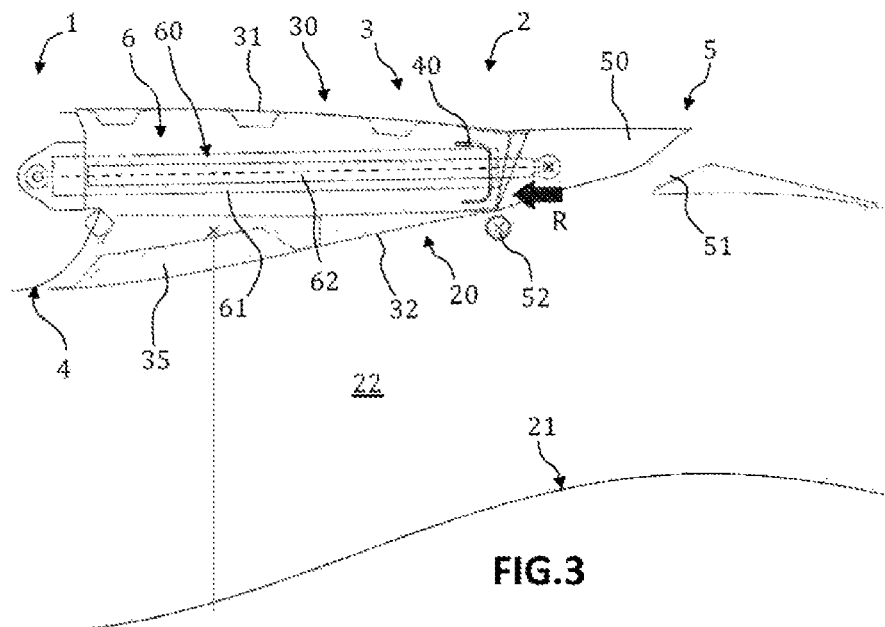
FIG. 3 is a partial diagrammatic longitudinal cross-sectional illustration of the nacelle of FIG. 1 in a second position with the moving cowl closed and the nozzle flap open, in which the actuating means of the cowl and the nozzle flap are shown.
Figure 4:
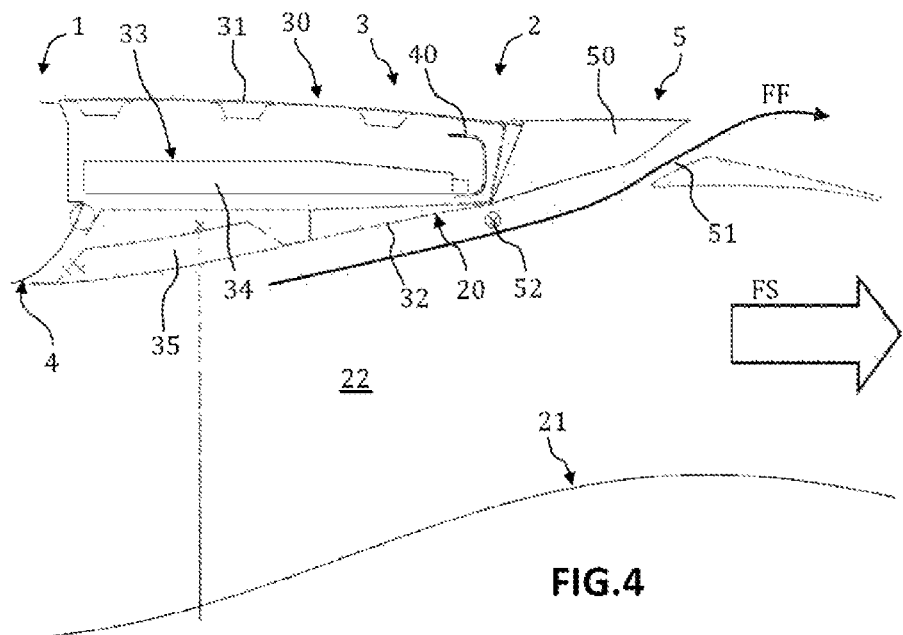
FIG. 4 is a partial diagrammatic longitudinal cross-sectional illustration of the nacelle of FIG. 3 in the second position, in which the cascade vane is illustrated.

The downstream section 2 comprises an outer structure 20 and an inner engine fairing structure 21 defining, with the outer structure 20, a tunnel 22 designed for the circulation of the cold air flow or secondary flow, illustrated by the arrow FS in FIGS. 2 and 4, in the case of the dual flow turbojet engine as described here.

The outer structure 20 comprises a thrust reverser device 3 integrating:
a moving cowl 30 comprising a shroud or outer wall 31 and an inner shroud or wall 32; and
means 33 for deflecting the flow made up of an assembly of cascade vanes 34.

The outer structure 20 further comprises:
a front fixed structure 4 made up of a front frame structure; and
a jet nozzle section 5.

The cowl 30 is designed to be actuated in a substantially longitudinal direction of the nacelle between two extreme positions:
a closed position (illustrated in FIGS. 1 to 4, called direct jet position) in which the inner shroud 32 comes into contact with the front frame 4 and the outer shroud 31 comes into contact with the middle section 1 and provides the aerodynamic continuity of the outer lines of the downstream section 2 for the situation of the secondary flow "FS" in the tunnel 22; and
an open position (illustrated in FIGS. 5 and 6, called reverse jet position), in which it opens a passage in the nacelle and exposes the deflecting means 33.

The cowl 30 allows the secondary flow "FS" of the turbojet engine to escape at least partially, said flow portion called deflected flow, illustrated by arrow "FD" in FIG. 6, being reoriented toward the front of the nacelle by the cascade vanes 34, thereby generating a counterthrust capable of braking the aircraft. The guiding of the moving cowl 30 relative to a fixed structure is done by a rail/slide system (not shown in the figure) known by those skilled in the art.

The cascade vanes 34 are supported upstream by the front frame structure 4 and are housed inside the moving cowl 30 in its open position. The cascade vanes 34 may also be supported downstream by a rear frame structure 40. In one form that is not illustrated, the cascade vanes 34 are of the self-supported type and are thus supported by the front frame structure 4 without being supported by a rear frame structure.

In order to increase the deflected flow "FD" (corresponding, as a reminder, to the secondary flow portion passing through the vanes 34) and therefore the counterthrust, the inner shroud 32 of the cowl 30 comprises multiple reverser flaps 35, distributed over its circumference and each mounted pivoting by one end around a hinge pin, between two extreme positions:
a retracted position (illustrated in FIGS. 1 to 4) concordant with the closing position of the cowl 30, in which the reverser flap 35 is folded down against the cowl 30 to close an access opening to the cascade vanes 34 and provide the inner aerodynamic continuity of the tunnel 22; and
a deployed position (illustrated in FIGS. 5 and 6) concordant with the open position of the cowl 30 (thrust reversal or reverse jet situation), in which the reverser 35 at least partially obstructs the tunnel 22 so as to deflect the secondary flow "FS" toward the cascade vanes 34.

Furthermore, the jet nozzle section 5 in the downstream extension of the moving cowl 30 comprises a series of nozzle flaps 50 rotatably mounted at a downstream end of the moving cowl 30 and distributed over the periphery of the jet nozzle section 5.

Each nozzle flap 50 is mounted rotatably between two extreme positions:
a closed position (illustrated in FIGS. 1, 2, 5 and 6) in which the nozzle flap 50 is folded down against the nozzle section 5 to close a leak passage 51 toward the outside of the nozzle 5 and to provide the inner aerodynamic continuity of the tunnel 22; and
an open position (illustrated in FIGS. 3 and 4), in which the nozzle flap 50 opens the leak passage 51 toward the outside of the nozzle 5, thereby putting the tunnel 22 in communication with the outside to establish a leak flow illustrated by the arrow "FF" in FIG. 4 and thereby increase the section of the nozzle 5.

Each nozzle flap 50 is supported by the moving cowl 30 by means of a pivot link 52 between the inner shroud 32 of the moving cowl 30 and the nozzle flap 50 along an axis perpendicular to the longitudinal axis of the nacelle. Thus, each nozzle flap 50 is pivotably mounted on the inner shroud 32 of the moving cowl 30.

Furthermore, each nozzle flap 50 switches from its closed position to its open position by pivoting toward the outside of the nozzle 5. In other words, each nozzle flap 50 protrudes outwardly from the nozzle when it occupies its open position.

Furthermore, the nacelle includes actuating means 6 capable of activating the translational movement of the cowl 30 and the pivoting of the nozzle flap 50; these actuating means 6 being shared by the cowl 30 and the nozzle flap 50 positioned in the extension of the cowl 30.

These actuating means 6 comprise at least one electric, hydraulic or pneumatic simple acting linear actuator 60. This actuator 60 may be placed between two longitudinal fastening lines of the cascade vanes 34.

The actuator 60 is capable of allowing the movement of the cowl 30 upstream or downstream from the nacelle and providing pivoting of the panels 50 of the nozzle 5 during phases for varying the section of the nozzle 5. This actuator 60 thus advantageously performs two functions, i.e., managing the pivoting of the nozzle flap 50 and managing the thrust reversal by controlling the moving cowl 30.

More specifically, the actuator 60 comprises a hollow body 61 inside which a translatable rod 62 is housed. The hollow body 61 is attached at its upstream end to the front frame structure 4, while the rod 62 is attached, at its free downstream end, to the nozzle flap 50; said rod 62 thereby passing through the upstream end of the moving cowl 30, and optionally the rear frame structure 40, to be fastened on the nozzle flap 50.

Alternatively, it is also possible to consider the following opposite solution: a threaded rod fixed in translation and rotating and a hollow tube connected on the one hand to the flaps and on the other hand to the threaded rod by means of a nut.

To manage the pivoting of the nozzle flap 50 and the translational movement of the moving cowl 30, the rod 62 of the actuator 60 is movable between:
- a first position, called idle position (shown in FIGS. 1 and 2), in which the rod 62 controls the moving cowl 30 in its closing position and the nozzle flap 50 in its closed position;
- a second position, called open position of the nozzle flap 50 (illustrated in FIGS. 3 and 4), in which the rod 62 is retracted inside the hollow body 61 relative to the first position, said rod 62 keeping the moving cowl 30 in its closed position and commanding the pivoting of the nozzle flap 50 toward its open position by going from the first to the second position; and
- a third position, called open position of the moving cowl 30 (illustrated in FIGS. 5 and 6), in which the rod 62 is deployed outside the hollow body 61 relative to the first position, said rod 62 controlling the translational movement of the moving cowl 30 toward its open position while keeping the nozzle flap 50 in its closed position while going from the first to the third position.

Thus, starting from the first idle position, it suffices to:
- retract the rod 62 (as diagrammed by arrow "R" in FIG. 3) to open the nozzle flap 50, which pivots toward the outside around its pivot articulation 52, without influencing the moving cowl 30, which remains closed;
- deploying the rod 62 (as diagrammed by arrow "D" in FIG. 5) to open the moving cowl 30, which translates toward the downstream direction, without affecting the nozzle flap 50, which remains closed.

Advantageously, the nacelle includes locking means (not shown) for locking the moving cowl 30 in its closed position on the front fixed structure 4, such that these locking means are activated in the first and second aforementioned positions of the rod 62, and are deactivated when the rod 62 goes from the first position to the third position.

Of course, the example form described above is in no way limiting, and other improvements and details may be contributed to the nacelle according to the present disclosure without going beyond the scope of the present disclosure, where other forms of deflecting means may for example be used.

What is claimed is:

1. A turbojet engine nacelle, comprising a thrust reverser device and an actuating system for said thrust reverser device, said thrust reverser device comprising:
    at least one moving cowl mounted translatably in a direction substantially parallel to a longitudinal axis of the nacelle alternating between a closed position, in which said moving cowl provides the aerodynamic continuity of the nacelle, and an open position, in which said moving cowl opens a passage in the nacelle for a deflected flow, the moving cowl comprising multiple reverser flaps; and
    at least one jet nozzle section for gases that extends said moving cowl and includes at least one nozzle flap mounted movable between a closed position and at least one open position in which said nozzle flap opens a leakage passage toward the outside of the nozzle section,
    wherein the nozzle flap is mounted pivoting on the moving cowl, and the actuating system comprises actuating means shared with the moving cowl and the nozzle flap and activates the translational movement of the moving cowl and the pivoting of the nozzle flap between three following positions:
        a first position, called idle position, in which the moving cowl is in its closing position and the nozzle flap is in its closed position;
        a second position, called open position of the nozzle flap, in which the moving cowl is in its closing position and the jet nozzle is in its open position; and
        a third position, called open position of the moving cowl, in which the moving cowl is in its open position and the nozzle flap is in its closed position.

2. The turbojet engine nacelle according to claim 1, wherein the actuating means activate the translation of the moving cowl from its open position toward its closing position, and next activate the pivoting of the nozzle flap from its closed position toward its open position while keeping the moving cowl in its closed position.

3. The turbojet engine nacelle according to claim 1 or 2, wherein the actuating means activate the pivoting of the nozzle flap from its open position to its closed position, and next activate the translational movement of the moving cowl from its closed position toward its open position or keeping the nozzle flap in its closed position.

4. The turbojet engine nacelle according to claim 1, wherein the thrust reverser device comprises a front fixed structure supporting at least one flow deflecting means housed inside the moving cowl in its open position, the actuating means being mounted on said first fixed structure.

5. The turbojet engine nacelle according claim 1, wherein the nozzle flap is pivotably mounted on an inner wall of the moving cowl.

6. The turbojet engine nacelle according to claim 1, wherein the nozzle flap switches from its closed position to its open position by pivoting toward the outside of the nozzle section.

7. The turbojet engine nacelle according to claim 1, wherein the actuating means comprise a linear actuator provided with a hollow body inside which a translatable rod is housed, said translatable rod crossing through the moving cowl and having a free end fixed on the nozzle flap.

8. The turbojet engine nacelle according to claim 7, wherein the translatable rod of the linear actuator is movable between:
    the first position, called the idle position, when the translatable rod controls the moving cowl in its closing position and the jet nozzle section in its closed position;
    the second position, called the open position of the nozzle flap, in which the translatable rod is retracted inside the hollow body relative to the first position, said translatable rod keeping the moving cowl in its closing position and controlling the pivoting of the nozzle flap toward its open position by going from the first to the second position; and
    the third position, called the open position of the moving cowl, in which the translatable rod is deployed outside the hollow body relative to the first position, said translatable rod controlling the translational movement of the moving cowl toward its open position and keeping the nozzle flap in its closed position by going from the first to the third position.

9. The turbojet engine nacelle according to claim 7, wherein the hollow body is fixed on the front fixed structure.

* * * * *